US011234320B2

(12) United States Patent
Shi et al.

(10) Patent No.: US 11,234,320 B2
(45) Date of Patent: Jan. 25, 2022

(54) SWITCHED MODE POWER SUPPLY IDENTIFICATION (71) Applicant: SIGNIFY HOLDING B.V., Eindhoven (NL)

(72) Inventors: Liang Shi, Shanghai (CN); Gang Wang, Shanghai (CN); Wei Hong Zhao, Shanghai (CN); Peiliang Dong, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 217 days.

(21) Appl. No.: 16/305,600

(22) PCT Filed: May 19, 2017

(86) PCT No.: PCT/EP2017/062137
§ 371 (c)(1),
(2) Date: Nov. 29, 2018

(87) PCT Pub. No.: WO2017/207304
PCT Pub. Date: Dec. 7, 2017

(65) Prior Publication Data
US 2020/0329543 A1 Oct. 15, 2020

(30) Foreign Application Priority Data

May 30, 2016 (WO) ................ PCT/CN2016/083947
Jul. 26, 2016 (EP) ..................................... 16181207

(51) Int. Cl.
H05B 45/3725 (2020.01)
H05B 47/19 (2020.01)
(Continued)

(52) U.S. Cl.
CPC ......... H05B 47/19 (2020.01); H05B 45/3725 (2020.01); H05B 45/375 (2020.01); H05B 45/38 (2020.01); H05B 45/385 (2020.01)

(58) Field of Classification Search
None
See application file for complete search history.

(56) References Cited

U.S. PATENT DOCUMENTS 7,759,881 B1 * 7/2010 Melanson ............... H05B 45/14
315/307
7,804,256 B2 * 9/2010 Melanson ............... H05B 45/38
315/291
(Continued)

FOREIGN PATENT DOCUMENTS

WO 2013067550 A2 5/2013
WO WO-2013067550 A2 * 5/2013 .............. H02M 1/36
(Continued)

OTHER PUBLICATIONS

Arthur Radun, "An Alternative Low-Cost Current-Sensing Scheme for High-Current Power Electronics Circuits," IEEE Transactions on Industrial Electronics, Feb. 1995 (7 Pages).

Primary Examiner — Amy Cohen Johnson
Assistant Examiner — Srinivas Sathiraju (57) ABSTRACT An electronic device is for identifying a LED driver which is a switched mode power supply. For example the LED driver is part of an LED luminaire. An interface (24) is adapted to be coupled to a high frequency power commutation component of the switched mode power supply, for sensing the high frequency power commutation of the switched mode power supply in driving the LED. A mapping is made between identifications of LED drivers which are switched mode power supply and characteristics of the high frequency power commutations in driving the LED of a respective switched mode power supply. Thus, a LED driver (Continued)

which uses a switched mode power supply can be identified corresponding to extracted characteristics of the high frequency power commutations in driving the LED. This identification can be used for energy monitoring and fault diagnosis purposes, for use in a universal low cost LED driver.

12 Claims, 7 Drawing Sheets

(51) Int. Cl.
*H05B 45/375* (2020.01)
*H05B 45/38* (2020.01)
*H05B 45/385* (2020.01)

(56) References Cited

U.S. PATENT DOCUMENTS

| | | | | |
|---|---|---|---|---|
| 7,863,828 | B2* | 1/2011 | Melanson | H02M 1/4225 315/247 |
| 7,969,125 | B2* | 6/2011 | Melanson | H02M 1/4225 323/222 |
| 8,076,920 | B1* | 12/2011 | Melanson | H02M 3/005 323/299 |
| 8,174,204 | B2* | 5/2012 | Melanson | H05B 45/38 315/291 |
| 8,212,491 | B2* | 7/2012 | Kost | H05B 45/3725 315/247 |
| 8,836,236 | B1* | 9/2014 | Chiang | H05B 45/10 315/291 |
| 9,496,793 | B2* | 11/2016 | Bruwer | G01R 27/2605 |
| 9,608,533 | B2* | 3/2017 | Ostrovsky | H02M 5/293 |
| 9,814,108 | B2* | 11/2017 | Wang | H05B 47/105 |
| 10,154,569 | B2* | 12/2018 | Harris | H05B 47/105 |
| 10,452,966 | B2* | 10/2019 | Kanda | G06K 19/02 |
| 10,624,017 | B2* | 4/2020 | Wang | H04L 1/1825 |
| 10,624,161 | B2* | 4/2020 | Wang | H05B 47/105 |
| 2004/0095081 | A1* | 5/2004 | Kernahan | H05B 41/2827 315/307 |
| 2008/0157603 | A1* | 7/2008 | Baarman | H04B 5/0037 307/104 |
| 2009/0230870 | A1* | 9/2009 | Quazi | H05B 41/042 315/85 |
| 2014/0139107 | A1* | 5/2014 | Hariharan | H05B 45/382 315/85 |
| 2014/0203730 | A1* | 7/2014 | Cheng | H05B 45/3725 315/297 |
| 2014/0232201 | A1* | 8/2014 | Staring | H02J 50/60 307/104 |
| 2014/0253032 | A1* | 9/2014 | Bruwer | H02M 3/33507 320/108 |
| 2014/0317315 | A1* | 10/2014 | Duchesneau | H01B 3/24 709/250 |
| 2015/0115883 | A1* | 4/2015 | Huang | H02J 7/025 320/108 |
| 2015/0296598 | A1* | 10/2015 | Haid | H05B 45/382 315/291 |
| 2016/0057838 | A1* | 2/2016 | Maros | H01F 38/14 315/291 |
| 2017/0048937 | A1* | 2/2017 | Wang | H05B 45/3725 |
| 2017/0164436 | A1* | 6/2017 | Wang | G05F 1/56 |
| 2017/0214150 | A1* | 7/2017 | Zhao | H01Q 21/0025 |
| 2018/0294714 | A1* | 10/2018 | Chu | H02M 1/44 |
| 2019/0028953 | A1* | 1/2019 | Wang | H04W 40/125 |
| 2019/0212001 | A1* | 7/2019 | Shi | H05B 45/36 |
| 2019/0239332 | A1* | 8/2019 | Hidding | H01S 3/0903 |
| 2019/0261471 | A1* | 8/2019 | Wang | H01F 38/14 |
| 2020/0329543 | A1* | 10/2020 | Shi | H05B 47/19 |
| 2021/0176838 | A1* | 6/2021 | Long | H05B 45/10 |

FOREIGN PATENT DOCUMENTS

| | | | | |
|---|---|---|---|---|
| WO | WO-2013067550 A3 * | 12/2013 | | H05B 47/10 |
| WO | 2015162081 A2 | 10/2015 | | |

* cited by examiner

SWITCHED MODE POWER SUPPLY IDENTIFICATION

CROSS-REFERENCE TO PRIOR APPLICATIONS

This application is the U.S. National Phase application under 35 U.S.C. § 371 of International Application No. PCT/EP2017/062137, filed on May 19, 2017, which claims the benefit of International Application No. PCT/CN2016/083947, filed on May 30, 2016 and European Patent Application No. 16181207.8, filed on Jul. 26, 2016. These applications are hereby incorporated by reference herein.

FIELD OF THE INVENTION

This invention relates to systems which use switched mode power supplies, and in particular the identification of different types system based on the use of different types of switched mode power supply.

BACKGROUND OF THE INVENTION

The invention is of particular interest for lighting driver circuits.

Lighting is responsible for around 10% of total energy consumption worldwide. It follows that energy saving is an important issue for the development of lighting systems.

Energy monitoring of lighting devices is well known, for example based on the use of intelligent lighting control solutions. For example, it is known to provide a sensor connected to the driver of a LED luminaire for collecting environmental information such as room occupancy and ambient light conditions, and to derive the energy consumption of the luminaire. The sensor then sends the collected data to a gateway device wirelessly. Other smart devices may also be used to communicate with the driver.

The gateway aggregates data from the individual sensors and sends the information to an energy management module for analysis. The energy management module then provides an interface to enable adjustment of settings, to monitor and analyze energy savings and to monitor other data collected by the sensor network.

To use this system, the LED driver must contain an extra power output for powering the sensor and an extra data interface to send the energy consumption data to the sensor. The driver also needs to have the capability to monitor its power output, i.e., the power consumption of the luminaire.

These additional functions increase the cost of the driver. One example of such a driver is the high-end Philips (trade mark) "Advance Titanium SR" LED driver which provides DC power as well as energy reporting data directly to an associated sensor.

It would therefore be desirable to enable power consumption monitoring without needed a dedicated interface between a sensor and the driver.

The connection between the LED driver (which is within a luminaire) and the sensor (which is external to the luminaire) is typically a wired connection. This also adds complexity to luminaire design and decreases the application flexibility.

It would therefore be desirable to avoid the need for a dedicated wired connection between the sensor and the LED driver.

The sensor may be implemented as a common (general purpose) module, which is intended to be attached to any kind of luminaire and interact with it.

To realize the communication between the sensor and the driver, the sensor for example may need to identify the type of luminaire to which it is connected. The driver and sensor are for example equipped with connectivity module like ZigBee, Wi-Fi or DALI. Before the interaction between devices, the communication function needs to recognize the devices which are communicating with each other.

However, there is a large base of luminaires which do not have a connectivity function equipped. For this kind of luminaire, identification of the type of luminaire becomes a problem.

Moreover, in detecting the power consumption of the driver, only a few parameters are detectable by an external sensor. These parameters are not enough. Identifying a luminaire/driver can bring the extra parameters that are mapped to this luminaire/driver and those all parameters can be used together for calculating the power consumption.

It would therefore be desirable to have a simple way to enable a sensor or other remote smart device to be able to identify a luminaire without requiring modification to the luminaire itself.

SUMMARY OF THE INVENTION

The invention aims to address one or more of the issues explained above. A basic idea of the embodiments of the invention is identifying the system by its driver's switching behavior. More specifically, most of the drivers are constituted substantially by a switched mode power supply. During the switching, power commutation occurs, and the power commutation signal contains high frequency components. The inventor has found that the combination of the high frequency components is unique within a set of the switched mode power supplies. Thus it is reliable to identify the switched mode power supply according to the high frequency components. The invention is defined by the claims.

According to examples in accordance with an aspect of the invention, there is provided an electronic device for identifying a system which incorporates a switched mode power supply, comprising:

an interface adapted to be coupled to a high frequency power commutation component of the switched mode power supply, for sensing the high frequency power commutation of the switched mode power supply;

a processing circuit, for extracting characteristics of the high frequency power commutation;

a database which stores a mapping between identifications of systems and characteristics of the high frequency power commutations; and a controller for looking up an identification corresponding to the extracted characteristics of the high frequency power commutations, according to the stored mapping.

This device is able to determine the type of system being used to provide power, based at least on switching characteristics of the incorporated switched mode power supply. The electronic driver is for example for providing conversion of a mains voltage to a dc drive voltage for powering a dc component such as LED lighting. By identifying the type of system, for example a luminaire type, it becomes possible for a system to be connectable to systems which employ different driver types, and take account of the system type and in particular the driver type when providing output information, or when communicating within a larger overall system. By identifying the type of system, various types of information can be obtained without the need to directly measure electrical signals. By way of example, it may become possible to determine the power consumption of the powered dc component without the need to measure a current. The power may be obtained based on simpler voltage or timing measurements combined with information based on the electronic driver identification. Note that by "high frequency" is meant that the electronic driver provides a switching function at a frequency greater than the frequency of its input, which is typically a rectified mains voltage. The switching frequency of a switched mode power supply is at least KHz.

The interface is for example adapted to be coupled to a secondary side inductor of the switched mode power supply, which comprises a transformer with a primary side and the secondary side.

The switched mode power supply is for example a high frequency switched mode power supply, such as an LED driver, having an isolating transformer. The secondary side is the secondary side inductor of the transformer.

The interface may comprise a sensor having a sensor module coil which functions as a receiver coil and is adapted to be electromagnetically coupled to a transmission coil connected across the secondary side inductor of the switched mode power supply.

The sensor thus senses a voltage using a coil which is part of the secondary side of an isolating transformer of the switched mode power supply.

The processing circuit may be adapted to measure from the sensor module coil, as said characteristics, a switching frequency, a duty cycle and an amplitude of the high frequency power commutation, wherein said amplitude of the high frequency power commutation comprises:

a voltage reflected from the input voltage on the primary side; and/or an output voltage on the secondary side.

These characteristics of the sensor module coil can all be measured by analysis of a voltage waveform. They are thus simple to obtain with low cost and low power circuitry. In this way, characteristics are retrieved.

The controller may be adapted to derive from the identification of the system a second set of pre-stored information comprising at least one of:

a transformer ratio and an inductance of the transformer;

an efficiency of the switched mode power supply; and a compensation factor for compensating for the presence of the transmission coil in the switched mode power supply.

The sensor module coil measures the output voltage. With knowledge of the transformer ratio, the input side voltage can be derived. The inductance of the transformer may comprise the primary side inductance and/or the secondary side inductance. With knowledge of the inductance, the current be derived.

More specifically, the controller may be adapted to calculate a third set of information comprising at least one of:

an input voltage into the switched mode power supply;

a LED forward voltage;

an output current; and an output power.

The output current can be used to determine the output power. Instead, the output power can be determined without any need for the current to be determined as a separate parameter (since it is an intermediary parameter only need as part of the calculation of the output power).

The database may store identifications of each system by associating different drive settings to corresponding characteristics of the high frequency power commutations.

By taking account of drive settings, such as dimming settings in the case of a device for monitoring an LED luminaire, it becomes more possible to provide unique identification of a particular luminaire type.

The interface may comprise a sensor having a sensor module coil adapted to be electromagnetically coupled to a high frequency switched power inductor of the switched mode power supply, and the processing circuit is adapted to detect, as said characteristics, one or more frequencies of the switching noise which follows a switching of the switched mode power supply.

The switching noise frequency is greater than the high frequency commutation frequency. For example, the high frequency commutation frequency may be in the kHz range whereas the switching noise components may be in the MHz range. The inventor has also found that the switching noise is also specific to particular driver types within a set of possible switched mode power supplies.

The sensor may comprise the sensor module coil and a matching network which are tunable for finding one or more resonant frequencies of the switching noise.

A frequency sweep may thus be carried out to find the one or more resonant frequencies, and they provide identification of different system types, in particular based on different switched mode power supply types, because of their different frequencies in the switching noise due to different power circuit designs, PCB layout, power component selection etc. of the switched mode power supply.

The interface may comprise a wireless transmitter for transmitting the extracted characteristics wirelessly to the controller.

Examples in accordance with another aspect of the invention provide a lighting device comprising:

a luminaire;

a sensing module for sensing a type of luminaire, the sensing module comprising a device as defined above.

Examples in accordance with another aspect of the invention provide a method for identifying a system incorporating a switched mode power supply, wherein the switched mode power supply comprises a high frequency power commutation component, the method comprising:

sensing the high frequency power commutation of the switched mode power supply;

extracting characteristics of the high frequency power commutation;

obtaining an identification of the system based on the extracted characteristics of the high frequency power commutations using a stored mapping between identifications of systems and characteristics of the high frequency power commutations The sensing may be based on a voltage on a secondary side inductor of the switched mode power supply, and the method comprises measuring a switching frequency, duty cycle and amplitude of the high frequency power commutation, wherein the method further comprises deriving a switched mode power supply output current and/or a switched mode power supply output power.

The sensing may be based on a voltage on a secondary side inductor of the switched mode power supply, and the method comprises measuring one or more resonant frequencies of the switching noise which follows a switching transition of the switched mode power supply.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which:

FIG. 3 shows the driver at 100% output power, and FIG. 4 shows the driver at 10% output power;

DETAILED DESCRIPTION OF THE EMBODIMENTS

The invention provides an electronic device for identifying a system incorporating a switched mode power supply. For example the switched mode power supply may be part of an LED driver which is part of an LED luminaire. An interface is adapted to be coupled to a high frequency power commutation component of the switched mode power supply, for sensing the high frequency power commutation of the switched mode power supply. A mapping is made between identifications of systems and characteristics of the high frequency power commutations. Thus, a system which uses a switched mode power supply can be identified corresponding to extracted characteristics of the high frequency power commutations.

This identification can be used for energy monitoring and fault diagnosis purposes. In one possible use case, the device is separate to the LED driver or luminaire. The device is then a standalone unit, which may be attached to any supported luminaire design, and then obtain power and information wirelessly. The device sees a switched mode power supply and its associated lighting unit as its source. To obtain power information, it needs to identify the luminaire. Since, an LED luminaire includes a driver, the identification of the driver is equivalent to the identification of a luminaire. If there are different luminaire types which use the same driver type of drive, the LED used is typically different. Thus, the LED voltage will also influence the driver working status and it may be detected by the device as one of the elements used to identify the luminaire.

Figure 1:
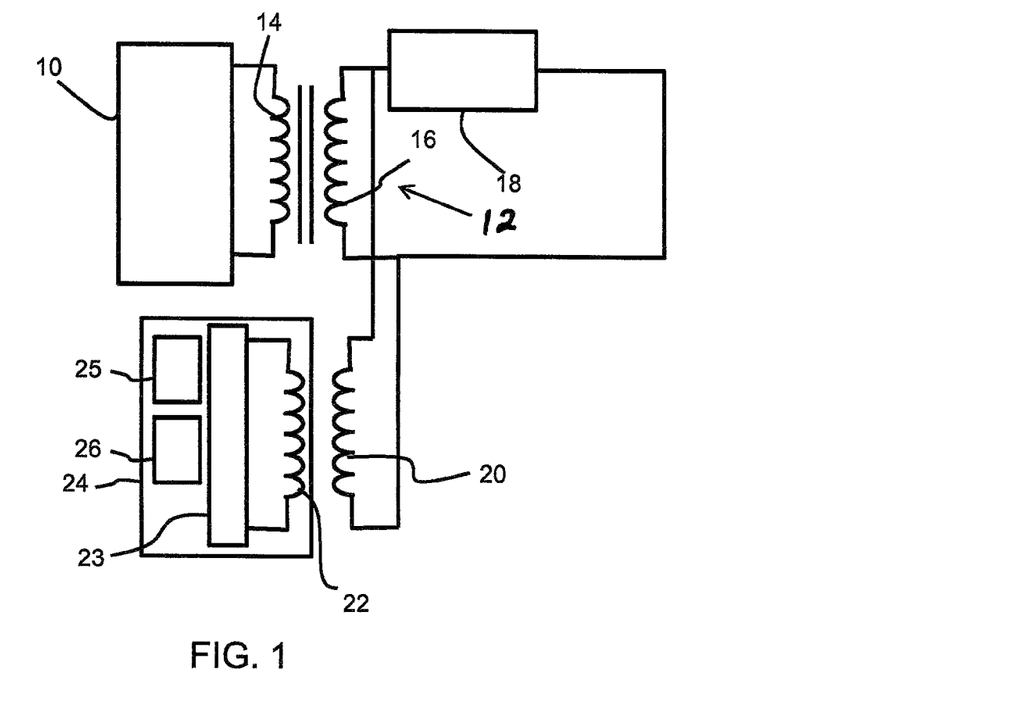
FIG. 1 shows a first example of a driver circuit, which is used in particular for energy monitoring purposes.

FIG. 1 shows a first example of a driver circuit, which is used in particular for energy monitoring purposes. The figure shows a driver circuit 10 having a switched mode power supply having an isolating transformer 12 at its output. This is a typical flyback converter structure. Alternatively, the switched mode power supply can be any other type, such as a buck converter, or a boost converter, or a buck-boost converter. The isolating transformer 12 has a primary side winding 14 and a secondary side winding 16 reversely dotted with respect to the primary side winding 14. The driver circuit 10 includes a main power switch at the primary side, which controls the driving of current through the primary side winding 14 in known manner. The main power switch is switched on and off, with a duty cycle which varies in dependence on the power output requirements. During this switching on/off, the power at the primary side is delivered to the secondary side by the transformer 12. A load 18 such as an LED lighting load is driven by the secondary side. The isolating transformer functions as a flyback transformer of the switched mode power supply.

In parallel with the secondary side winding 16, there is an auxiliary transmission coil 20. A sensor module coil 22 and processing circuit 23 form part of a sensor module 24. The sensor module 24 is used to provide wireless transmission of power consumption information, for example to an energy monitoring system.

The sensor module coil 22 receives power wirelessly from the transmission coil 20. By monitoring the signals on the sensor module coil 20, the sensor module 24 collects characteristic parameters of the detected waveform using the processing circuit (even during luminaire dimming) for identification purposes, and in particular to identify the luminaire type which incorporates the driver.

The sensor module 24 obtains detailed design parameters of the driven luminaire which are stored in a database 25 using a controller 26 to interrogate the database, and the real-time working waveform of the sensor module coil 22 can then be used to calculate the power consumption.

FIG. 1 shows the controller 26 and database 25 within the sensor module 24 which provides the interface to the driver. The controller and database may instead be remote, with wireless (or wired) communication between the sensor module (i.e. the coil 22 and processing circuit 23) and the database and controller.

Figure 2:
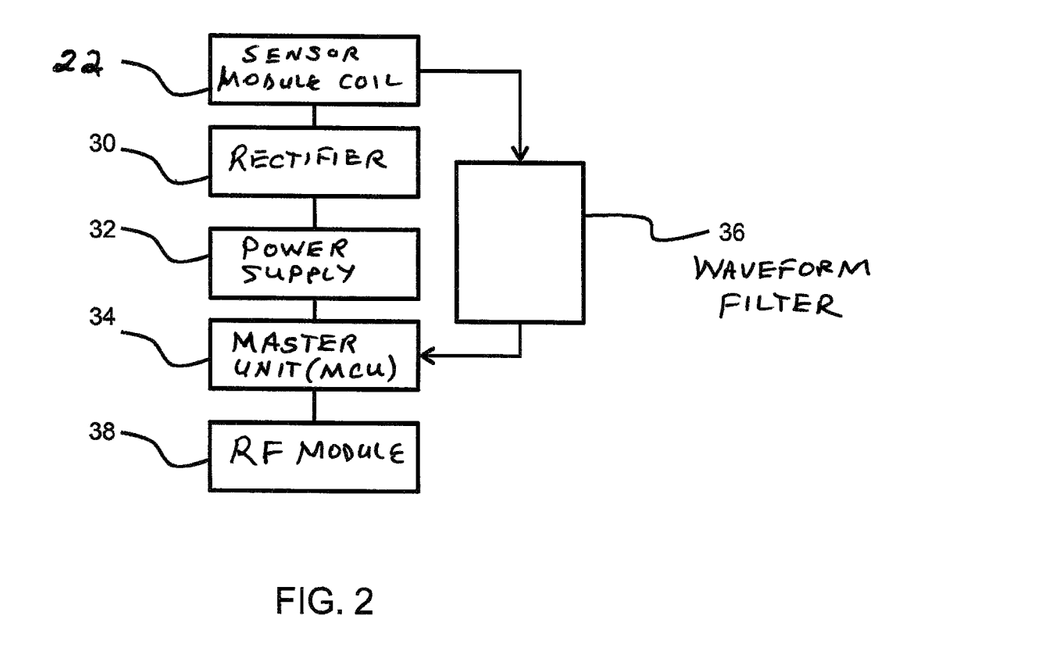
FIG. 2 shows a block diagram of the sensor module used in FIG. 1, which functions as an energy monitoring module.

FIG. 2 shows a block diagram of the sensor module 24, which functions as an energy monitoring module.

The signal received across the sensor module coil 22 is provided to a rectifier 30 which generates a power supply 32, which in turn powers a master control unit (MCU) 34. This master control unit 34 corresponds to the processing circuit 23, database 25 and controller 26 of FIG. 1. The signal from the sensor module coil 22 is in parallel provided to a waveform filter 36 and the filtered signal is provided to the master control unit 34. The filtering removes the noise of the signals from the sensor module coil and provides clean waveforms to the MCU for analysis. The waveform on the sensor module coil 22 is a mirror of the secondary side of the flyback converter.

This analysis determines the energy consumption. After analysis, the energy consumption information is transmitted by an RF module 38.

Figure 3:
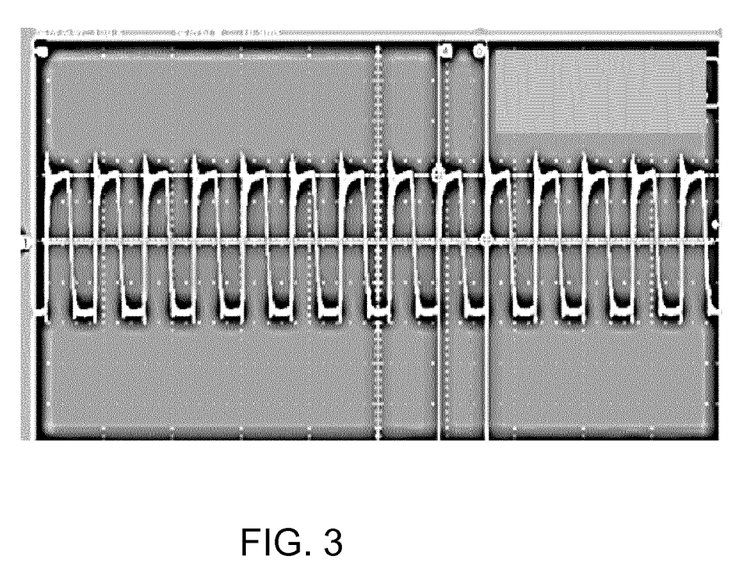
FIGS. 3 and 4 show the waveforms on the sensor module coil when the LED driver is working at different levels of output power.
Figure 4:
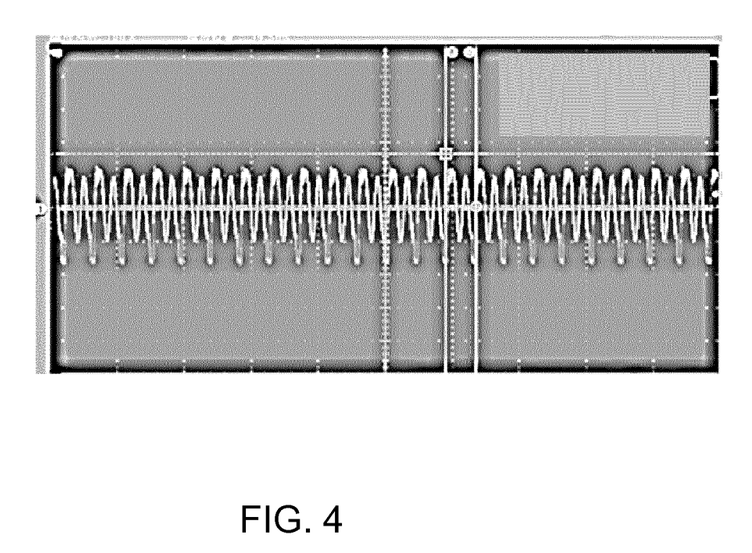

FIGS. 3 and 4 show the waveforms across the sensor module coil 22 when the LED driver is working at different levels of output power. FIG. 3 shows the driver at 100% output power, and FIG. 4 shows the driver at 10% output power.

Characteristic parameters, including the PWM frequency (f), duty circle (D), primary side voltage reflected at the secondary side ($V_{rp}$) and the secondary side voltage ($V_{rs}$) can be read directly from the waveforms.

The primary side reflected voltage and the secondary side voltage are related by the turns ratio.

In order to measure the power consumption using known approaches, a power meter is generally placed in series with a power line to monitor the voltage and current directly. The magnetic coupling used in the sensor module 24 only provides voltage information, so that the current information required to perform a power calculation is absent.

According to the working mode (boundary mode) of most LED drivers, the current can be estimated based on the input voltage, duty circle and inductance of the transformer. The voltage and duty can be obtained directly from the detected waveforms as in FIGS. 3 and 4, but the inductance is a parameter associated with each driver and is different for different driver types, and hence is different for different luminaire types which incorporate different drivers.

In order to obtain this inductance information the database 25 may be interrogated.

In this way, the sensor carries out identifying the type and version of the luminaire which the drive is operating. The database 25 forms part of the master control unit 34 as explained above and may be used to obtain the driver information such as the transformer ratio, inductance etc.

Each of type of LED driver has a different control method, transformer and system design to meet diverse luminaire requirements. Thus, different drivers, as used in different luminaires, have unique characteristic parameters, and the luminaires also have different characteristics, such as different LED designs and circuit layouts. For example, different LED voltage characteristics result in different secondary side voltages Vrs, and the the transformer design within the driver affects the primary side voltage reflected at the secondary side Vrp, the frequency and the duty cycle.

However, a given type of luminaire has the same system configuration, and a given transformer design has good consistency of parameters between different examples as a result of mass production processes. In this way, each combination of driver and luminaire has a unique set of characteristic parameters which can be detected for the purposes of the identification explained above.

During an identification process, the sensor module 24 collects the waveform characteristic parameters such as the PWM frequency (f), duty circle (D) and amplitudes (Vrp and Vrs) to compare with reference information. More specifically, as to the amplitude of the voltage, in case the converter is a flyback converter, during the switch on phase, the transmission coil has a voltage Vrp that is proportional to the input voltage at the primary side (the input voltage divided by the turns ratio of the transformer); and during the switching off phase, the transmission coil has a voltage Vrs that is on the secondary winding. The reference information forms pre-stored characteristic parameters of the LED driver of each type of luminaire.

In an even further embodiment, the luminaire is dimmed and the corresponding characteristic parameters of the switching for different dimming level are also different. The sensor module is not aware of the luminaire dimming level when the sensor module is being used. The reference information in the master control unit for each type of luminaire may be divided into groups, in which each group records the unique parameters of the target luminaire at a certain dimming level (for example 100%, 50% and 10%). Some characteristic parameters (such as frequency and secondary side voltage) change linearly during dimming, while some other not, so that even if the sensed data matches two types of luminaire by the unchanged parameters, it may still be possible to detect a unique luminaire by using the changed frequency and secondary side voltage as an additional input parameter to distinguish.

In order to use the system, the sensor module 24 is applied to the existing driver. The identification waveform is then obtained, and parameters are extracted which do not change with dimming level. The parameters which do not change during dimming depend on the circuit design.

During LED driver dimming, the secondary side/LED voltage, LED current, and switching frequency may change, but the duty cycle of switching and the primary side voltage Vrp may remain the same.

These are compared with the database 25 pre-stored in the master control unit. If there is more than one type of luminaire that matches the parameters then further information such as the frequency and secondary side voltage is used.

After the identification procedure, the sensor module 24 may then be able to narrow down the luminaire design to only one matching type. The database may be updated online to be compatible with the latest luminaires.

The identification process thus takes lace not only when the sensor module is initially attached. The identification instead runs during operation, in particular if different measurements are required at different dimming levels to confirm or narrow down the identification.

The table below shows an example of the identification procedure. The values in the table are an example to illustrate the concept.

TABLE 1

| Luminaire No. | | Luminaire calibration reference characteristic parameter | | | |
| --- | --- | --- | --- | --- | --- |
| | dimming | Frequency (f) | Duty circle (D) | Vrp (V) | Vrs (V) |
| 1(for example) | 100% | 70 kHz | 0.40 | 2.50 | 2.10 |
| | 50% | 90 kHz | 0.40 | 2.50 | 2.05 |
| | 10% | 105 kHz | 0.40 | 2.50 | 2.00 |
| 2(for example) | 100% | 56 kHz | 0.35 | 2.00 | 1.60 |
| | 50% | 65 kHz | 0.35 | 2.00 | 1.55 |
| | 10% | 73 kHz | 0.35 | 2.00 | 1.50 |
| 3(for example) | 100% | 45 kHz | 0.35 | 2.00 | 1.70 |
| | 50% | 60 kHz | 0.35 | 2.00 | 1.64 |
| | 10% | 72 kHz | 0.35 | 2.00 | 1.58 |

There are three luminaire types in the table. For each one, the values of frequency, duty cycle, secondary side voltage Vrs and reflected primary side voltage Vrp are listed. The values are recorded for three different dimming levels.

When the dimming level is changed, the two parameters (switching frequency, and Vrs) will typically change at same time; while the other two parameters (duty cycle and Vrp) will not change. As a first step, the combination of Vrp and duty circle may be compared with a database. There may be a fit with one or two luminaires with different dimming levels. By additionally using Vrs and switching frequency for interrogation, only one result will typically remain. Thus, by monitoring a sufficient number of different parameters, it becomes possible to uniquely identify specific luminaire types (i.e. combinations of driver and lighting load).

Figure 5:
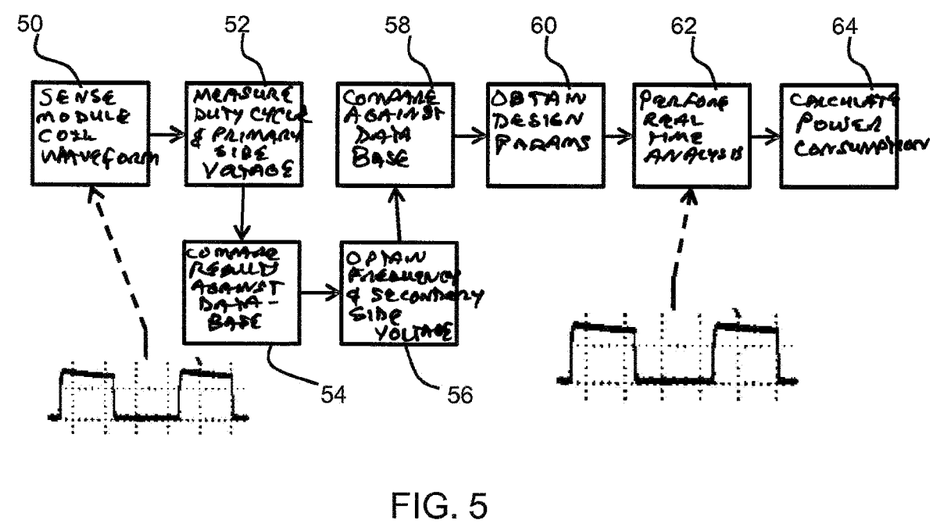
FIG. 5 shows one example of identification procedure.

FIG. 5 shows one example of identification procedure based on the data in the tables above.

In step 50, the sensor module is fitted to the driver of the luminaire to be driven. The sensor module coil waveform is sensed as a first identification waveform. In step 52 the duty cycle and primary side voltage are measured.

For example, the duty cycle may be measured as D=0.35 and Vrp=2V.

In step 54 the database is accessed and it reveals that luminaires 2 and 3 provide a match, based on the first table above.

In step 56 the frequency f and secondary side voltage Vrs are obtained. For example f=70 kHz and Vrs=1.6V In step 58, the database is addressed again, and this time only luminaire 3 is a match (within defined margins).

In step 60, the design parameters of luminaire number 3 are obtained.

The module then performs real time analysis of the sensor module coil waveform in step 62. Using the obtained parameters of the driver, it is able to calculate and report the power consumption in step 64.

The identification function thus involves dynamic waveform analysis. Once a luminaire type is identified, more specific driver design parameters are obtained to enable an estimate of the current levels which is necessary for further power consumption calculation.

The table below shows the LED driver parameters which become known once the luminaire type, and hence driver type, has been identified. As shown, the transformer ratio N, transformer inductance L, efficiency η and a compensation factor K are then known. The compensation factor K denotes how much the influence of the additional transmitter coil 20 is upon the converter.

TABLE 2

LED driver design parameter

| X'mer ratio (N) | X'mer Inductance (L) | efficiency (η) | compensation factor (k) |
|---|---|---|---|
| 120:27 | 1 mH | 85 | 1.2 |
| 70:32 | 350 uH | 87 | 1.15 |
| 100:42 | 500 uH | 90 | 1.1 |

Using the stored parameters in combination with the sensor module coil waveform, various operating values may be obtained from the sensor module coil waveform, such as:

Input voltage (=Vrp×N). Note that the sensor module coil is placed on the secondary of transformer, so the direct measured value is the secondary side-reflected primary voltage Vrp. Multiplication by the transformer ratio N gives the input voltage;

LED forward voltage (=Vrs−Vdiode). Note that a rectifier diode is often provided between the secondary winding of the transformer and LED load. To obtain an accurate LED voltage the forward voltage Vdiode of this diode is also pre-stored in relation to the identification of the driver and is taken into account;

LED current (=½×Vrs×Ton×(1−D)/L×K). This is based on the LED driver working at discontinuous or boundary mode for higher efficiency;

Power consumption(=$V$led×$I$led×η).

K is a compensation factor used to compensate the influence of the additional transmitter coil 20. For a flyback topology, the transmitter coil 20 is not only for the transfer of energy to the attached sensor module 24, it also participates in the working of the LED driver as a part of transformer.

The calculations above are simplifications, and more accurate calculations may be used.

Figure 6:
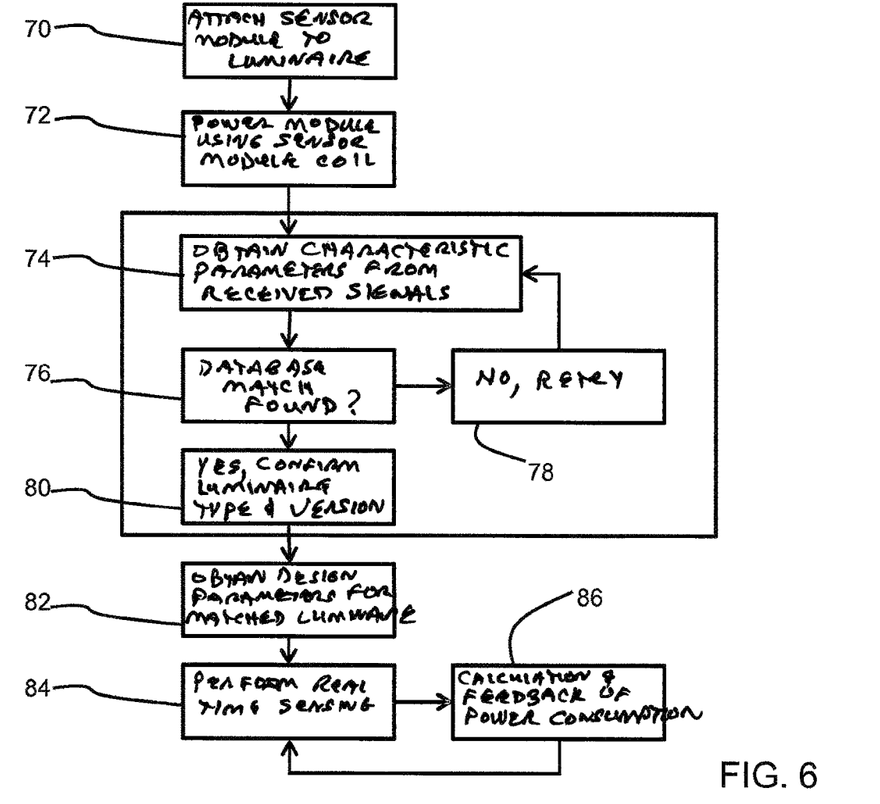
FIG. 6 shows an energy monitoring method using the sensor module.

FIG. 6 shows an energy monitoring method using the senor module.

In step 70, the sensor module is attached to the luminaire.

In step 72, the module is powered by harvesting energy from the sensor module coil.

In step 74, the characteristic parameters are read from the received signals (f, D, Vrs, Vrp).

In step 76, the parameters are used to address the database. If there is no match, the method returns via step 78 for a retry. After a number of failed match attempts (e.g. 3) the system reports an error.

If a match is found, the luminaire type and version is confirmed in step 80.

In step 82, the luminaire design parameters are obtained (N, L, η, K).

In step 84, real time sensing is carried out of the sensor module coil signal, and in step 86 there is calculation and feedback of the power consumption information.

The feedback may be made to a system control center wirelessly (Zigbee or Bluetooth) and it provides the customer with the ability to easily manage lighting system settings and access detailed operational reports. The real time performance data gives the customer the ability to fine-tune lighting settings to match the needs of a facility, making it easy to keep the lighting setting in sync with changes in business patterns and processes.

The feedback may also be used to provide diagnosis of the luminaire operation status. If something is wrong with the LED (partial failure) or if there is driver failure, this may be sensed by the sensor module and reported to the control center.

The example above relates in particular to the monitoring of power consumption without the need for direct current sensing, and using a sensor module which may be applied as a retrofit to an existing driver.

Another application of the frequency-based identification is for facilitating communication with a luminaire, when this requires identification of the luminaire type. As explained above, different luminaires use different types of LED driver.

This aspect also relates to identification based on frequency characteristics of the driver. Most drivers implement a hard switching function of the main power switch rather than a soft switch switching function. These abrupt switching edges create ringing signals, at the moment of turn on/off, and this results in the emission of radiation. The radiation frequency is equal to the ringing frequency and this depends on the driver design.

Different switched mode power supply circuit designs are used in different drivers and there are also different parasitic components. For example, there are different power components, snubber circuits, PCB layouts etc. There are almost no two different types of driver which have the same combination of characteristic frequencies.

The driver described above uses a flyback topology with boundary working mode. If a coil is placed near to the luminaire (without forming a circuit as in the example above), strong radiation can be detected by the coil. The coil is again the sensor module coil 22 of a sensor module 24 as explained above.

Figure 7:
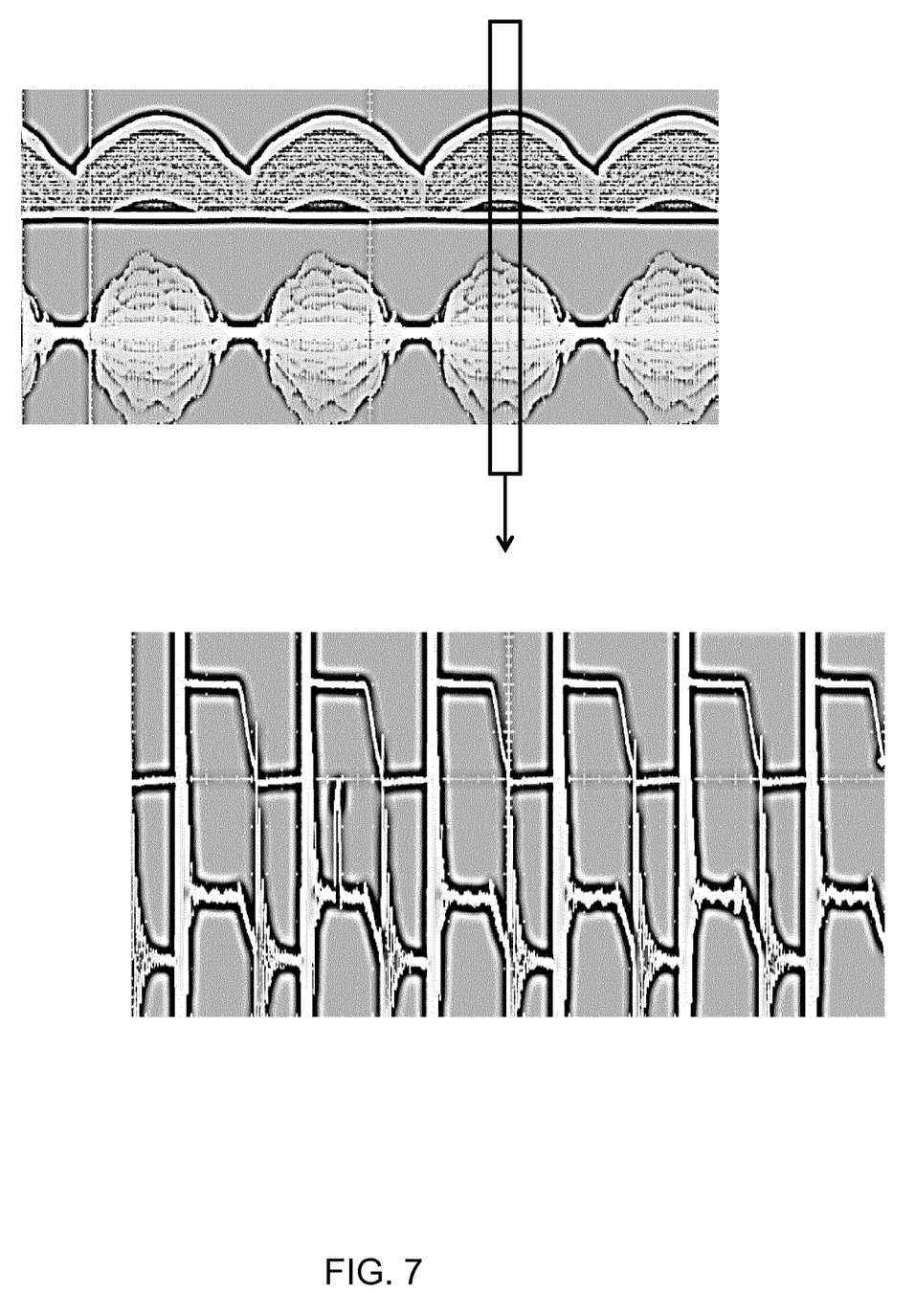
FIG. 7 shows a radiation pattern sensed by a sensor module coil.

FIG. 7 shows a radiation pattern sensed by such as coil. The top waveform is the drain source voltage across the main switch of the switched mode driver and the bottom waveform is the signal sensed by the coil wirelessly. The top image shows the low frequency rectified mains envelope shape, and the enlarged lower image shows the high switching frequency of the converter.

Figure 8:
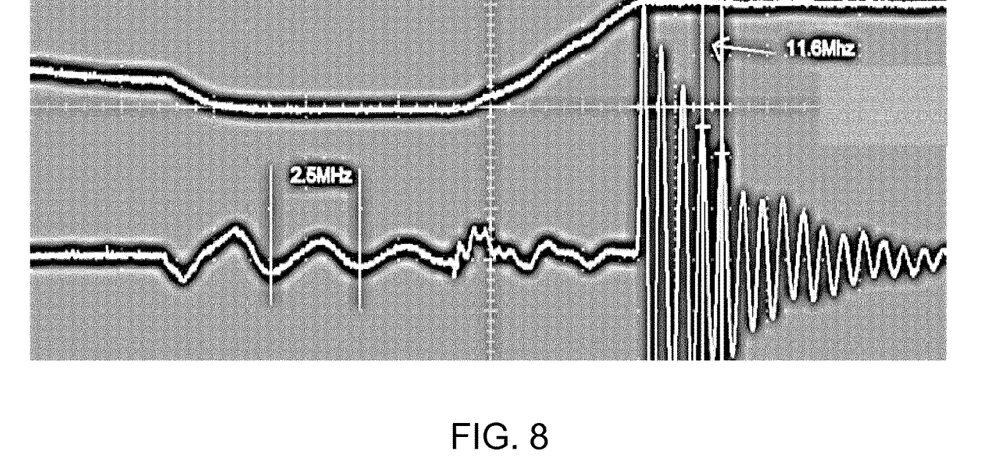
FIG. 8 shows a sensed signal with two major frequencies.

The sensed signal contains two major frequencies as shown in FIG. 8. It shows one on-off-on cycle the main power switch (the top plot). One frequency component occurs when the driver switch turns off, and it has a ringing frequency of 11.6 MHz with a relatively large amplitude. The other oscillation is at 2.5 MHz; its amplitude is smaller since the switching turns on at minimum current level. Many current LED drivers are designed to work at quasi-resonance, whereby the main switch always turns on from zero current. This gives much smaller ringing behavior.

To monitor the characteristic frequency or frequencies of the radiation emitted by the driver, a receive antenna and matching network are used which are tunable, to form the sensor module. When the resonant frequency of the antenna equals the radiation frequency, the antenna and matching network will self-oscillate and present a peak value at the sensor module output.

Figure 9A:
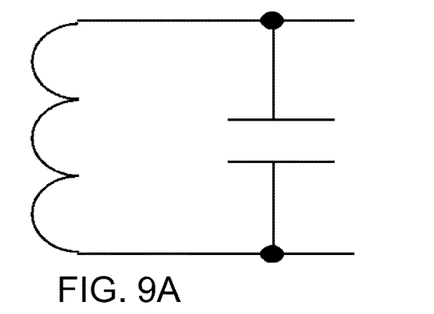
FIGS. 9a-c shows three examples of a wireless receiver circuit.
Figure 9B:
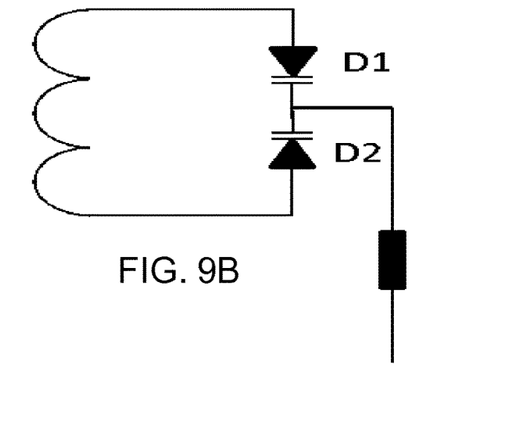
Figure 9C:
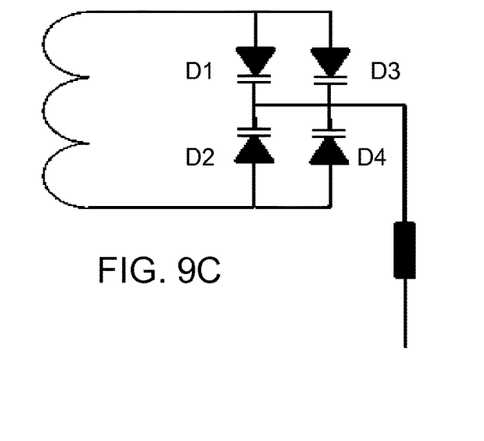

FIG. 9 shows three examples of a wireless receiver circuit. FIG. 9A shows a coil and a capacitor as matching network. The system resonant frequency is $1/\sqrt{2\pi LC}$. If the capacitor is removed, the system resonant frequency is equal to the coil self-oscillation frequency.

FIG. 9B shows a tunable resonant frequency circuit. A tuning voltage is applied to the junction between two back-to-back diode-based devices D1, D2. The coil is designed to have higher self-oscillation frequency than the expected driver radiation frequency (<30 MHz).

D1 and D2 are in fact hyper abrupt junction tuning varactors which function as a tunable capacitor. The capacitance changes according to the bias voltage applied between the diode-based devices D1, D2. The capacitance can be extended by having more parallel varactors D1 to D4 as shown in FIG. 9C.

Figure 10:
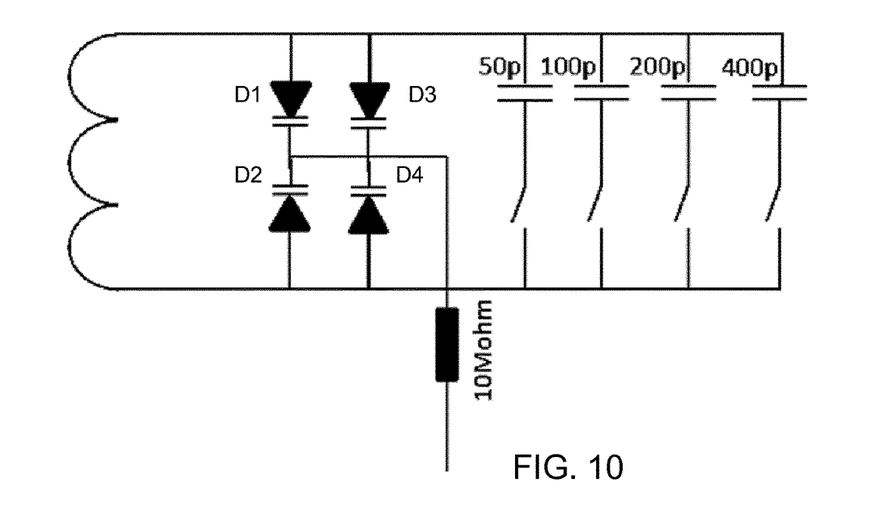
FIG. 10 shows one of example of a tunable varactor circuit.

FIG. 10 shows one of example of a tunable varactor circuit. The capacitance range of the varactors alone is for example from 1 pF to 40 pF. If the coil inductance is 10 μH and its parasitic capacitance is about 3 pF then the coil self-oscillation frequency is about 30 MHz.

If the varactor capacitance tuning range is from 1 pF-40 pF then the tunable resonant frequency range of the sensor module could extend from 25 MHz to 7 MHz.

The Minimum 7 MHz is not enough for an LED driver application, since the expected tuning range is from 1 MHz to 30 MHz.

For this reason, a bank of parallel capacitors is provided forming a binary weighted ladder network, each with an associated series switch. The resulting capacitor switching matrix extends the capacitance tunable range.

The capacitor switching matrix combined with the varactor circuit means the capacitance tuning range may be 1 pF-1 nF and the resonant frequency range is then from 25 MHz to 1 MHz. The frequency tuning range should take into account the parasitic capacitors of the switches, so the coil self-oscillation frequency may be designed slightly higher than 30 MHz to provide a maximum frequency higher than 25 MHz.

Figure 11:
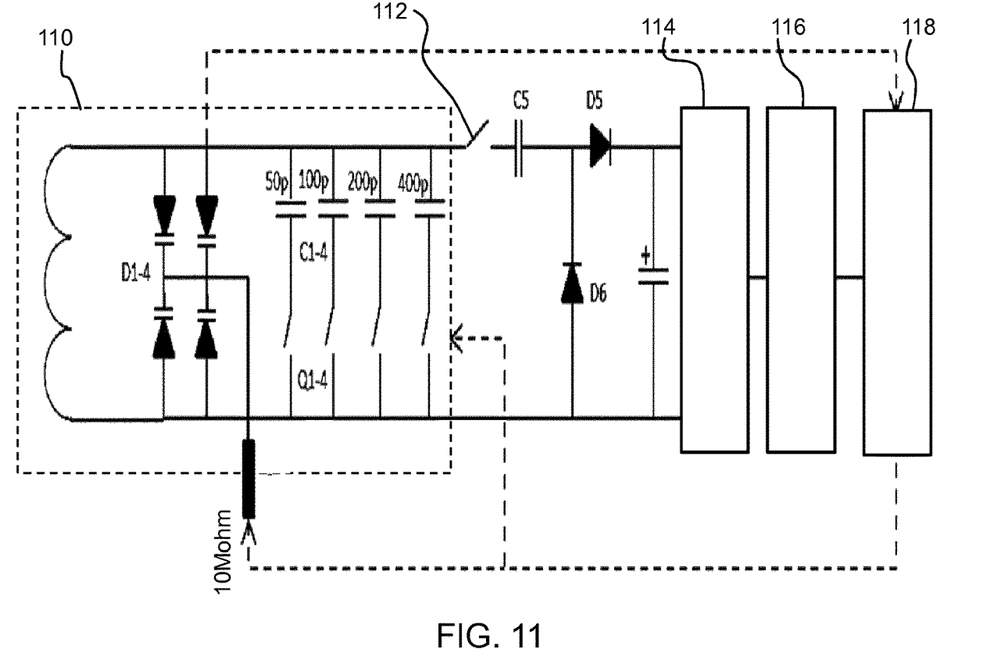
FIG. 11 shows a system block chart using the tunable sensor module.

FIG. 11 shows the complete system block chart. The tunable sensor module is shown as 110. A switch 112 is used to isolate the load from coil during frequency sweeping, so that the signal is not distorted by the load.

The received signal is boosted by boost converter 114, powered by a battery 116. A master control unit 118 monitors the signal strength and sweeps the frequency to find the driver characteristic frequency.

The sensor module could also harvest energy instead of using a battery as in the example above. The capacitor C5, and diodes D5 and D6 are a voltage doubler, which also may be used to provide a common ground for an energy harvesting system. The boost circuit for example comprises a high efficiency converter at light loads and may function as a battery charger when a battery is used.

Figure 12:
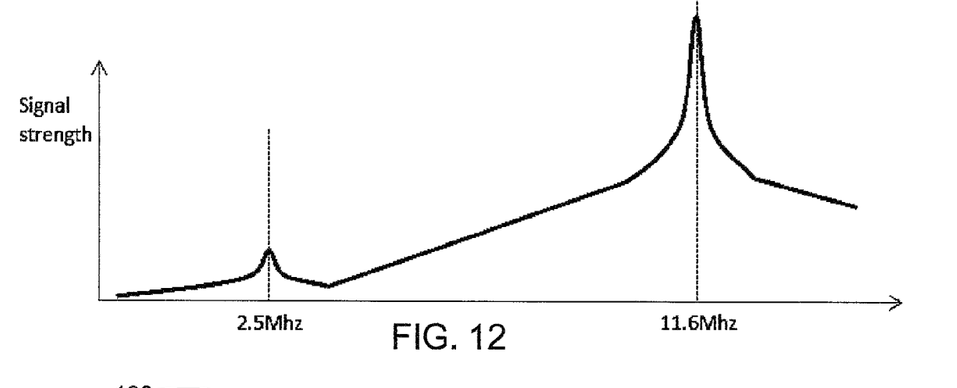
FIG. 12 shows the sweeping frequency result when using the system of FIG. 11.

FIG. 12 shows the sweeping frequency result. At 2.5 MHz and 11.6 MHz, the sensor module detects two signal spikes on the sensor module coil and these two frequencies are the characteristic frequencies of this particular driver.

The combination of these two values is unique to one particular type of driver, with only a very small variation between luminaires of the same type which use the same driver design. The characteristic frequency does not change with dimming (the signal strength is weaker but the frequency does not shift when dimming). This provides a reliable and accurate way to identify the driver and luminaire combination. This identification can also be used together with the above first embodiment so as to identify the driver and luminaire combination, As in the example above, a database includes luminaire information and the characteristic frequency of each luminaire. After interrogating the database based on the characteristic frequency information, the sensor module can identify the luminaire.

This method does not require any hard/wired connectivity function in the luminaire. A customer only needs to put the sensor module close to the target luminaire which is an existing luminaire without being modified.

Figure 13:
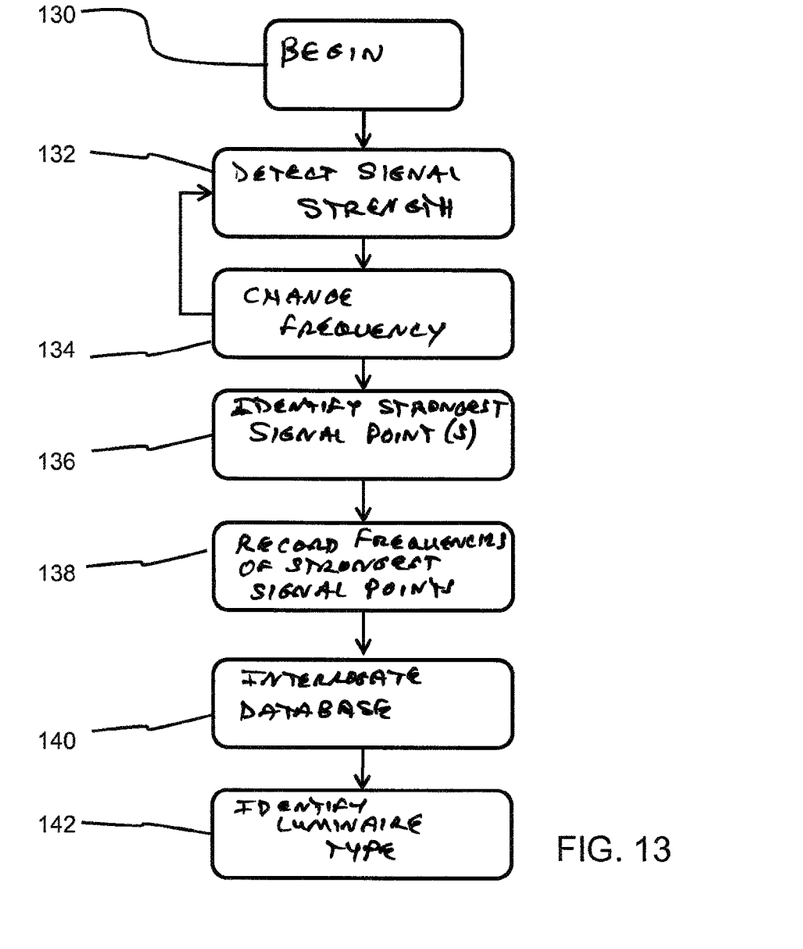
FIG. 13 shows an identification method.

FIG. 13 shows the identification method.

In step 130 the method starts.

In step 132 the signal strength is detected repeatedly with the frequency changed in step 134 to implement the frequency sweep.

In step 136 the strongest signal point or points are identified and the frequency or frequencies recorded in step 138. In step 140 the database is interrogated, and in step 142 the luminaire type is identified.

In all examples above, a switched mode power supply is identified, or else a device such as a luminaire driven by a switched mode power supply is identified. A sensor module is used which provides an interface which couples to the high frequency power commutation component of the switched mode power supply. The high frequency power commutation of the switched mode power supply is sensed, and characteristics are extracted. These may be one or more of amplitudes, switching frequencies, and duty cycles of the switching, as well as the resonant frequency or frequencies of the switching noise. A type of switched mode power supply may be identified, or a driver which uses a characteristic type of switched mode power supply, or a device which uses a characteristic type of driver.

The invention relates generally to the identification of a type of switched mode power supply based on analysis of the commutation signal which conveys information about the switching of the main power switch of the switched mode power supply. LED lighting is one application of particular interest, but the invention has other applications.

This invention can be used in any lighting fixture.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An electronic device for identifying a Light Emitting Diode (LED) driver which is a switched mode power supply, comprising:

an interface adapted to be coupled to a high frequency power commutation component which is a high frequency switched power inductor of the switched mode power supply, for sensing switching noise components of the high frequency power commutation of the switched mode power supply in driving a LED, wherein said interface comprises a sensor having a sensor module coil adapted to be electromagnetically coupled to the inductor, wherein the interface is adapted to be couple to a secondary side power inductor of the switch mode power supply which comprises a transformer with a primary side and the secondary side;

a processing circuit, for extracting characteristics of the switching noise components, wherein said characteristics comprises one or more frequencies of switching noise which follows a switching of the switched mode power supply;

a database which stores a mapping between identifications of LED drivers which are switched mode power supply and said characteristics of the switching noise components of the high frequency power commutations of a respective switched mode power supply in driving the LED; and a controller for looking up an identification of LED driver with a characteristic of the switching noise components of the high frequency power commutation in driving the LED corresponding to the extracted characteristics of the switching noise components of the high frequency power commutations in driving the LED, according to the stored mapping.

2. The device as claimed in claim 1, wherein the interface comprises the sensor module coil adapted to be electromagnetically coupled to a transmission coil connected across the secondary side inductor of the switched mode power supply.

3. The device as claimed in claim 1, wherein the processing circuit is adapted to measure from the sensor module coil, as said characteristics, a switching frequency, a duty cycle and an amplitude of the high frequency power commutation, wherein said amplitude of the high frequency power commutation comprises:

a voltage reflected from the input voltage on the primary side; and/or an output voltage on the secondary side.

4. The device as claimed in claim 3, wherein the controller is adapted to derive from the identification a second set of pre-stored information comprising at least one of:

a transformer ratio and an inductance, of the transformer;
an efficiency of the switched mode power supply; and
a compensation factor for compensating for the presence of the transmission coil in the switched mode power supply.

5. The device as claimed in claim 4, wherein the controller is adapted to calculate a third set of information comprising at least one of:

an input voltage into the switched mode power supply;
a LED forward voltage;
an output current; and
an output power.

6. The device as claimed in claim 1, wherein the database stores identifications of each LED driver at different drive settings to corresponding characteristics of the high frequency power commutations.

7. The device as claimed in claim 1, wherein the sensor comprises the sensor module coil and a matching network which are tunable for finding one or more resonant frequencies of the switching noise.

8. The device as claimed in claim 1, wherein the interface comprises a wireless transmitter for transmitting the extracted characteristics wirelessly to the controller.

9. A lighting device comprising:
a luminaire;
a sensing module for sensing a type of luminaire, the sensing module comprising the device as claimed in claim 1.

10. A method for identifying a Light Emitting Diode (LED) driver which is a switched mode power supply, wherein an interface is coupled to the switched mode power supply and the switched mode power supply comprises a high frequency power commutation component, which is a high frequency switched power inductor, the method comprising:

sensing, via the interface, switching noise components of the high frequency power commutation of the switched mode power supply in driving a LED by a sensor having a sensor module coil adapted to be electromagnetically coupled to the inductor which is a high frequency switched power inductor, wherein the interface is adapted to be coupled to a secondary side power inductor of the switch mode power supply which comprises a transformer with a primary side and the secondary side;

extracting characteristics of the switching noise components, wherein said characteristics comprises one or more frequencies of switching noise which follows a switching of the switched mode power supply;

obtaining an identification of the LED driver based on the extracted characteristics of the switching noise components of the high frequency power commutations in driving the LED using a stored mapping between identifications of LED drivers which are switched mode power supply and said characteristics of the switching noise components of the high frequency power commutations in driving the LED of a respective switched mode power supply.

11. The method as claimed in claim 10, wherein the sensing is based on a voltage on a secondary side inductor of the switched mode power supply, and the method comprises measuring a switching frequency, duty cycle and amplitude of the high frequency power commutation, wherein the method further comprises deriving a switched mode power supply output current and/or a switched mode power supply output power.

12. The method as claimed in claim 10, wherein the sensing is based on a voltage on a secondary side inductor of the switched mode power supply power, and the method comprises measuring one or more resonant frequencies of the switching noise which follows a switching transition of the switched mode power supply.

* * * * *